US006948732B2

(12) United States Patent
Amacker

(10) Patent No.: US 6,948,732 B2
(45) Date of Patent: Sep. 27, 2005

(54) CONVERTIBLE CARGO RACK

(76) Inventor: Joseph Amacker, 270 Adcox Rd., Rayville, LA (US) 71269

( * ) Notice: Subject to any disclaimer, the term of this patent is extended or adjusted under 35 U.S.C. 154(b) by 82 days.

(21) Appl. No.: 10/303,022

(22) Filed: Nov. 25, 2002

(65) Prior Publication Data
US 2004/0100045 A1 May 27, 2004

(51) Int. Cl.[7] .............................................. B60D 1/52
(52) U.S. Cl. ............................ 280/415.1; 280/491.5; 280/495
(58) Field of Search ..................... 280/415.1, 416.1, 280/416.3, 491.1, 491.3, 491.5, 493, 495, 507, 508, 514, 515, 769, 407, 447, 480.1, 494, 500, 502; 224/42.31, 42.32, 519; 70/258

(56) References Cited

U.S. PATENT DOCUMENTS

| 4,032,170 | A | * | 6/1977 | Wood ........................ 280/495 |
| 4,243,342 | A | * | 1/1981 | Marto ........................ 403/324 |
| 4,275,981 | A |   | 6/1981 | Bruhn ........................ 414/462 |
| 4,277,008 | A | * | 7/1981 | McCleary ................... 224/401 |
| 4,603,878 | A | * | 8/1986 | Smith, Jr. ................. 280/479.2 |
| 4,646,952 | A |   | 3/1987 | Timmers ................... 224/42.07 |
| 4,744,590 | A | * | 5/1988 | Chesney ..................... 280/769 |
| 4,838,743 | A | * | 6/1989 | Blunden et al. ............... 410/9 |
| 4,906,015 | A | * | 3/1990 | LaCroix et al. .......... 280/415.1 |
| 4,915,276 | A | * | 4/1990 | Devito ........................ 224/521 |
| 4,971,509 | A | * | 11/1990 | Sechovec et al. ........... 414/462 |
| 5,018,651 | A | * | 5/1991 | Hull et al. ................... 224/502 |
| 5,033,662 | A |   | 7/1991 | Godin ..................... 224/42.43 |
| 5,215,234 | A | * | 6/1993 | Pasley ........................ 224/508 |
| 5,224,636 | A |   | 7/1993 | Bounds .................... 224/42.44 |
| 5,368,209 | A |   | 11/1994 | Hill ......................... 224/42.44 |
| 5,427,289 | A |   | 6/1995 | Ostor ...................... 224/42.43 |
| 5,433,357 | A |   | 7/1995 | Alliff ........................ 224/510 |
| 5,699,985 | A | * | 12/1997 | Vogel ........................ 224/564 |
| 5,727,805 | A | * | 3/1998 | La Roque ................. 280/478.1 |
| 5,727,806 | A | * | 3/1998 | McCoy et al. ............... 280/494 |
| 5,755,454 | A | * | 5/1998 | Peterson .................. 280/491.1 |
| 5,775,560 | A |   | 7/1998 | Zahn et al. .................. 224/524 |
| 5,836,494 | A |   | 11/1998 | Grunsted et al. ............ 224/521 |
| 6,099,035 | A | * | 8/2000 | Garvin, III .................... 280/769 |
| 6,237,824 | B1 |  | 5/2001 | Bagley ....................... 224/521 |
| D445,738 | S | * | 7/2001 | Lindenman et al. ....... D12/162 |
| 6,253,981 | B1 |  | 7/2001 | McLemore .................. 224/526 |
| 6,286,854 | B1 | * | 9/2001 | Cross ......................... 280/504 |

(Continued)

OTHER PUBLICATIONS

Amacker Class 3 Receiver.*
Putnam Hitch Products Bulletin—5 sheets.
Web sheet—www.dualportsystem.com/aboutdps.htm—Dual Port System ([DPS] Draw–Title and Reese hav teamed up to give you the hitch system of the FUTURE.

Primary Examiner—Christopher Ellis
Assistant Examiner—Christopher Bottorff
(74) Attorney, Agent, or Firm—Blank Rome LLP

(57) ABSTRACT

The present invention is directed to a convertible cargo rack that can be configured in one of two positions. In the first configuration, the cargo rack is suspended behind a vehicle, and in the second configuration, the cargo rack is pulled behind the vehicle in a trailer-like fashion. In the first configuration, the cargo rack has at least two tubular receivers on its underside that correspond to at least two tubular receivers attached to the rear of the vehicle. Support bars are inserted into the receivers to suspend the cargo rack behind the vehicle. In the second configuration, the cargo rack is rotated 90 degrees and wheels are attached to the sides of the cargo rack. A trailer bar then pivotably attaches the cargo receiver to the vehicle's center tubular receiver so that the cargo rack can be pulled behind the vehicle in a trailer-like fashion. The tubular receivers that are secured to the vehicle are attached using a bracket that can accommodate vehicle support frames of various sizes and shapes. In this way the cargo rack can be used on almost any vehicle.

9 Claims, 8 Drawing Sheets

U.S. PATENT DOCUMENTS 6,334,561 B1    1/2002   Cole .......................... 224/521
6,428,031 B1 *  8/2002   McCoy et al. .............. 280/495
6,502,730 B2 *  1/2003   Johnson ..................... 224/519
6,540,277 B2 *  4/2003   McCoy et al. .............. 293/117
6,543,260 B2 *  4/2003   Koy et al. ..................... 70/34
6,588,239 B1 *  7/2003   Johansson .................... 70/14
6,659,490 B1 * 12/2003   Simpson ................. 280/416.1

* cited by examiner

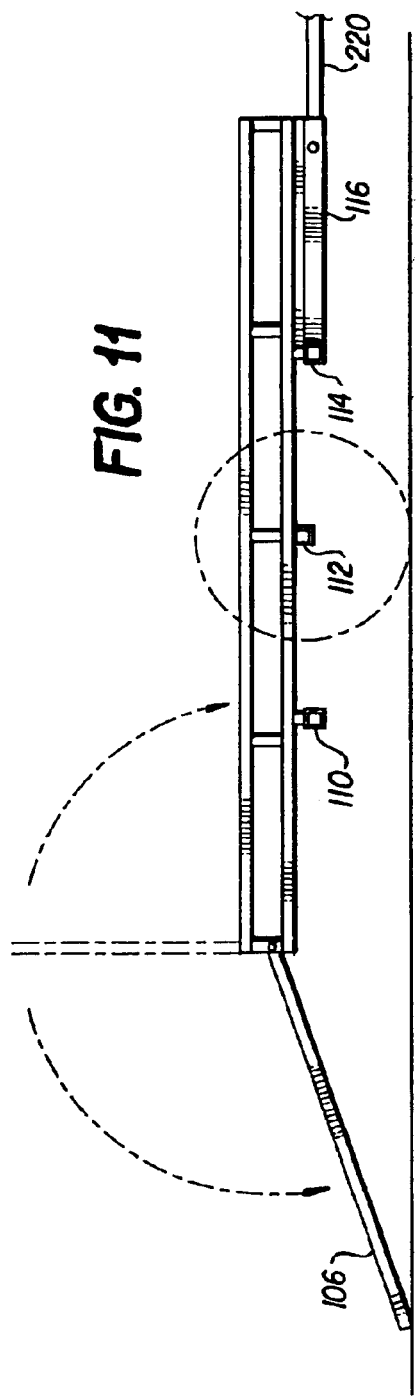
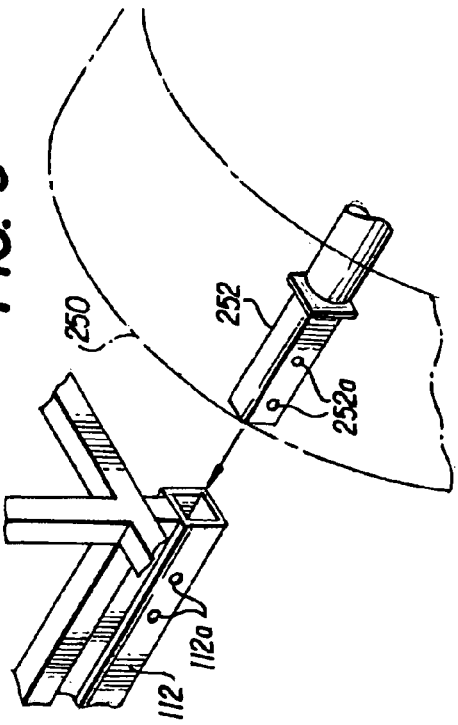
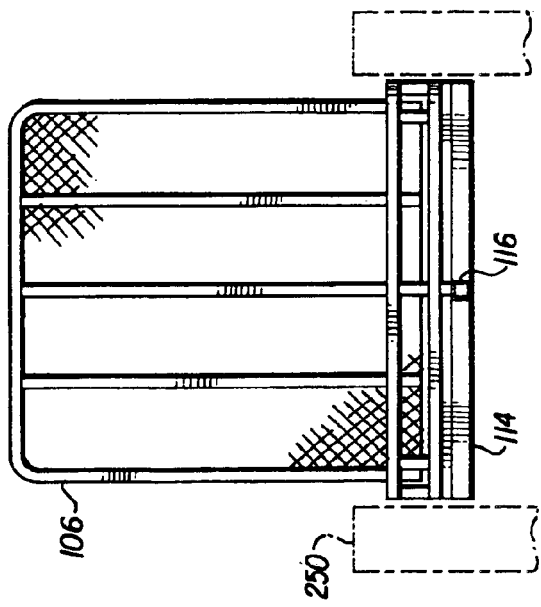

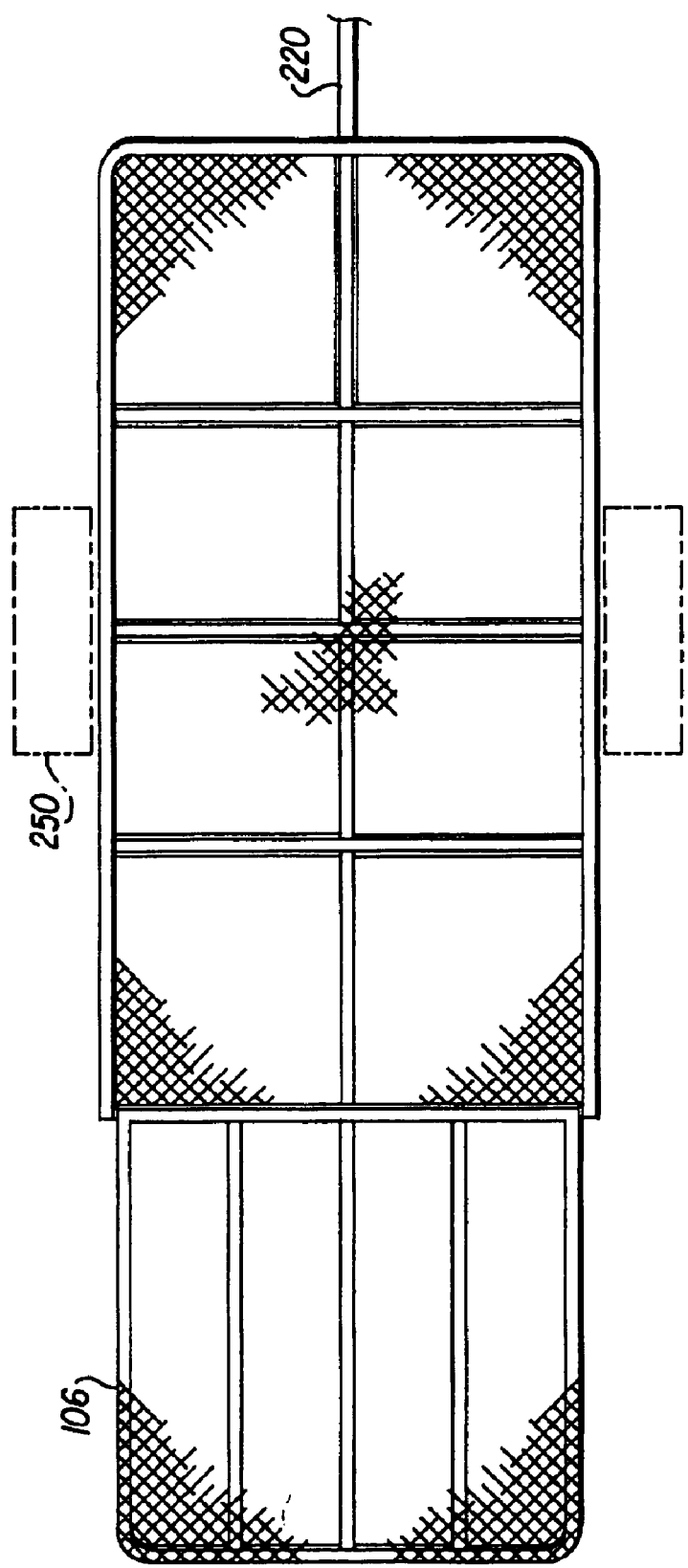

CONVERTIBLE CARGO RACK

FIELD OF INVENTION

The present invention is directed to a convertible cargo rack that attaches to the rear of a vehicle to carry additional payload in one of two positions. In the first position, the cargo rack is supported by support bars that suspend it behind the vehicle. In the second position, wheels are attached to the sides of the cargo rack, which is then pulled behind the vehicle in a trailer-like fashion.

BACKGROUND OF THE INVENTION

Cargo racks that attach to the rear of work vehicles are well known in the prior art. These devices are typically attached to create additional cargo space to carry such items as machines, tools, and other equipment. They can also be detached when not in use so as not to be an obstruction and to reduce any inconvenience to the driver.

Cargo racks in the prior art come in two general categories. The first type of cargo rack is suspended behind the vehicle by support bars, so that no part of the cargo rack is touching the ground. Examples of this type are shown in U.S. Pat. No. 4,915,276 to Devito, U.S. Pat. No. 5,033,662 to Godin and U.S. Pat. No. 5,427,289 to Ostor. The second type of cargo rack has wheels attached to its sides and is pulled behind the vehicle in a trailer-like fashion. Examples of this type are shown in U.S. Pat. No. 5,018,651 to Hull et al. and U.S. Pat. No. 5,368,209 to Hill.

The attachment used between the cargo rack and the vehicle depends on the type of cargo rack being used. For the suspended-type cargo rack, a strong and stable connection is required. Male and female connectors of the type shown in FIG. 1 of U.S. Pat. No. 4,744,590 to Chesney, exemplifies the type of connection commonly used.

For the trailer-type cargo rack, the connection must be able to rotate to allow the cargo rack the freedom to move independently behind the vehicle. A ball-joint connector is typically used for this purpose and is shown in FIG. 2 of Chesney.

SUMMARY AND OBJECTS OF THE INVENTION

The present invention is directed to a convertible cargo rack that can be configured in one of two positions. In the first configuration, the cargo rack is suspended behind a vehicle by two support bars. In a second configuration, wheels are attached to the sides of the cargo rack, which is then pulled behind the vehicle in a trailer-like fashion.

The cargo rack of the first configuration is located behind the vehicle in a suspended position. The underside of the cargo rack has two side tubular receivers that align with two similar tubular receivers on the vehicle. Support bars are inserted into the cargo rack and vehicle receivers to suspend the cargo rack and provide lateral support to prevent tilting or rotating of the cargo rack.

In the second configuration, wheels are attached to the sides of the cargo rack and a pivotable trailer bar is used to attach the cargo rack to the vehicle. The cargo rack is then pulled behind the vehicle in a trailer-like manner. In this configuration, because the cargo rack can be detached from the vehicle, it can also be used in a wheel-barrow type manner to transport loads short distances from the vehicle to other locations.

Because most cargo racks are add-ons to vehicles after they have been bought, they are usually installed by the cargo rack purchaser. Therefore, the invention also consists of a add-on tubular receiver that attaches to a structural frame member of a vehicle and allows the cargo rack to be attached to the vehicle. The add-on tubular receiver comprises a tubular receiver, two brackets that are secured to a structural member of the vehicle, and a spring biased locking pin. The brackets are configured so that they can be attached to structural members of various sizes and shapes. The locking pin automatically engages a support bar inserted into the tubular receiver to prevent unintended detachment of the cargo rack from the vehicle.

It is therefore an object of the present invention to provide a cargo rack that is convertible between a suspended position and a trailer position. It is a further object of the invention to provide a cargo rack that is suspended behind a vehicle using at least two support bars to provide lateral support for the cargo rack to prevent tilting. It is yet a further object of the invention to provide a cargo rack that can be attached to vehicle structural members of different sizes and shapes. It is another further object of the invention to provide a locking pin that automatically secures the cargo rack to the vehicle to prevent unwanted detachment of the cargo rack.

BRIEF DESCRIPTION OF THE DRAWINGS

FIG. 9 is a perspective view drawing of a wheel attached to the cargo rack;

FIG. 10 is a front view drawing of the cargo rack in the trailer configuration;

FIG. 11 is a side view drawing of the cargo rack in the trailer configuration;

FIG. 12 is a top view drawing of the cargo rack in the trailer configuration;

DETAILED DESCRIPTION OF THE INVENTION

Figure 2:
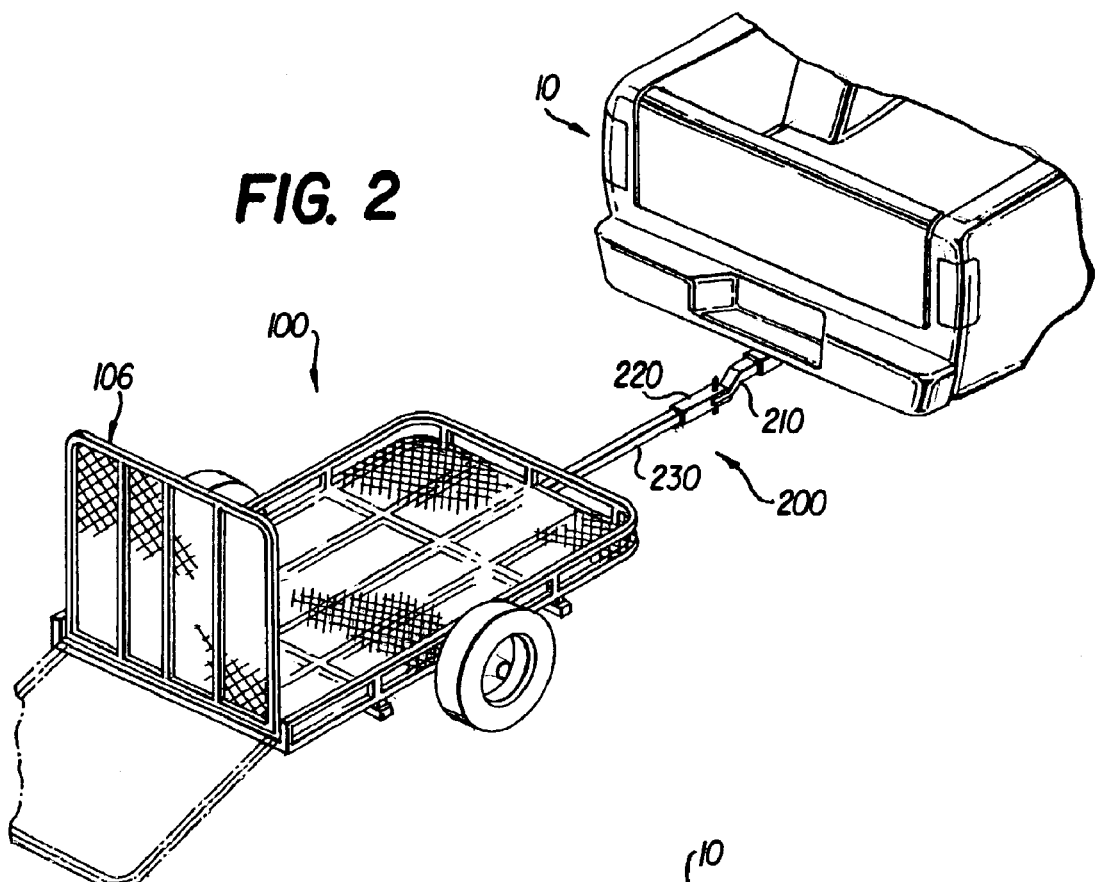
FIG. 2 is a perspective view drawing of the cargo rack of the present invention in a second trailer configuration.
Figure 1:
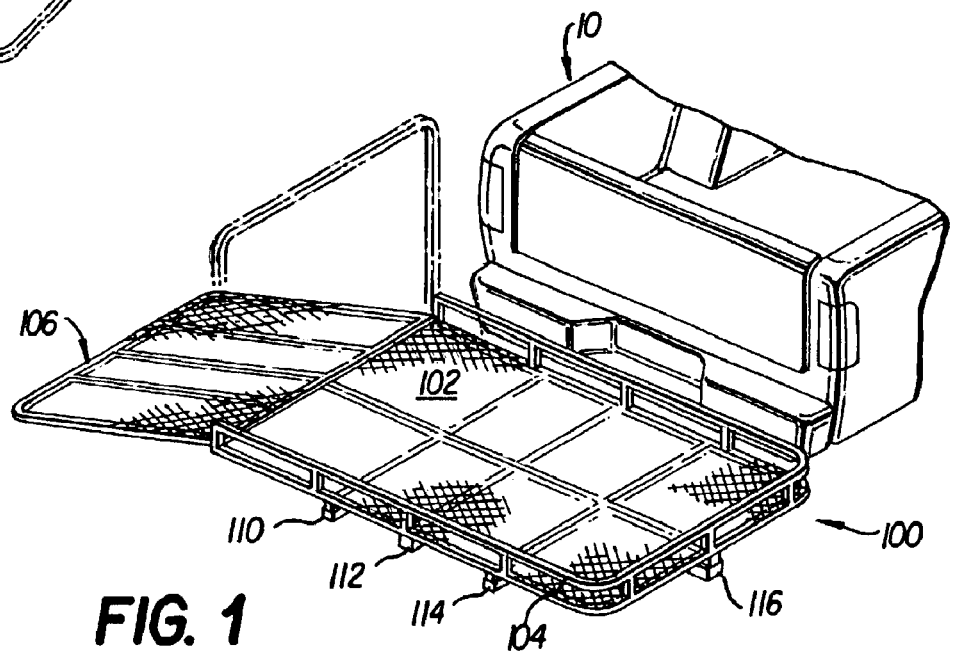
FIG. 1 is a perspective view drawing of a cargo rack of the present invention in a first suspended configuration.

Referring now in detail to the drawings, FIGS. 1 and 2 show a convertible cargo rack 100 in two alternate configurations. FIG. 1 shows a first configuration where the cargo rack 100 is suspended from the rear of the vehicle 10. FIG. 2 shows a second configuration where the cargo rack 100 is hitched to the rear of the vehicle 10 and is pulled in a trailer-like fashion.

The cargo rack 100 has flat platform area 102 surrounded by guardrails 104 on three sides. A ramp 106 is pivotably attached to a fourth side, and can be rotated between a first ramp position, a second upright position that encloses the platform 102, and a third stowed position where the ramp 106 is folded into the bed of the platform 102 (not shown).

Figure 3:
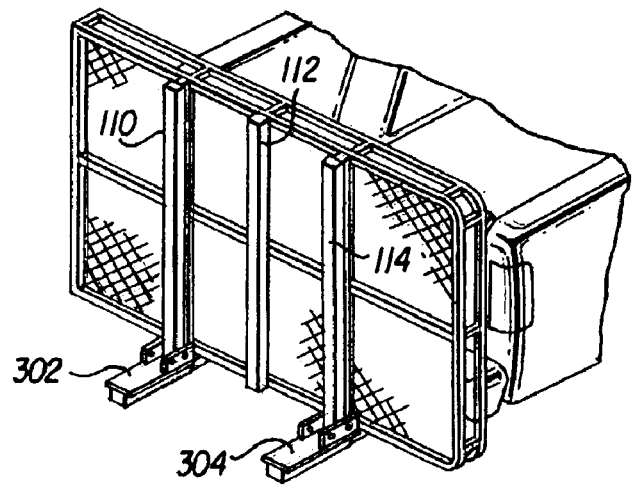
FIG. 3 is a perspective view drawing of the cargo rack in the suspended configuration in its stowed position.

A description of the invention is now given with respect to the first suspended configuration, wherein, FIGS. 1 and 3 show the suspended cargo rack 100 in its open and stowed position, respectively. In the open position of FIG. 1, the cargo rack 100 is level with the ground and extends away from the vehicle 10 allowing tools, cargo or other objects to be placed on the platform 102. In the stowed or unused position of FIG. 3, the cargo rack 100 is rotated to a vertical position parallel to the rear of the vehicle 10.

Figure 4:
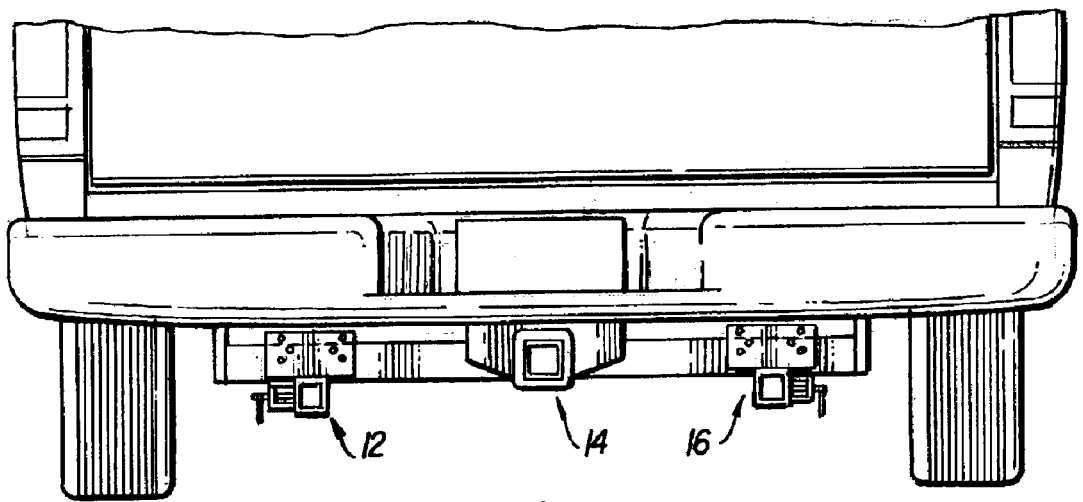
FIG. 4 is a rear view drawing of the rear of the vehicle.
Figure 8:
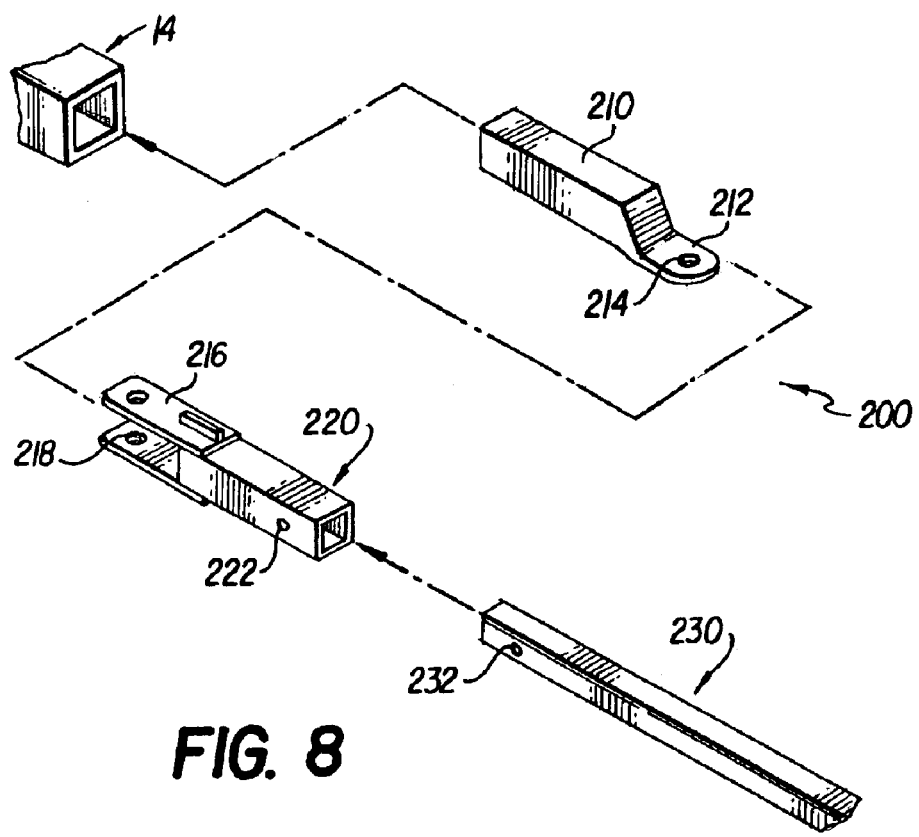
FIG. 8 is a perspective view drawing of a trailer hitch used with the cargo rack in the trailer configuration.

The cargo rack 100 has three tubular receivers 110, 112 and 114 attached to the underside of the platform 102, as best shown in FIG. 3. The three receivers 110, 112 and 114 are aligned with three corresponding receivers 12, 14, and 16, attached to the rear of the vehicle 10, as best shown in FIG. 4. In a first method of use for the first configuration of the invention, shown in FIGS. 3, 5–7, the cargo rack 100 is attached to the vehicle 10 by inserting two hinge or support bars 302, 304 into the vehicle's side receivers 12,16.

Figure 5:
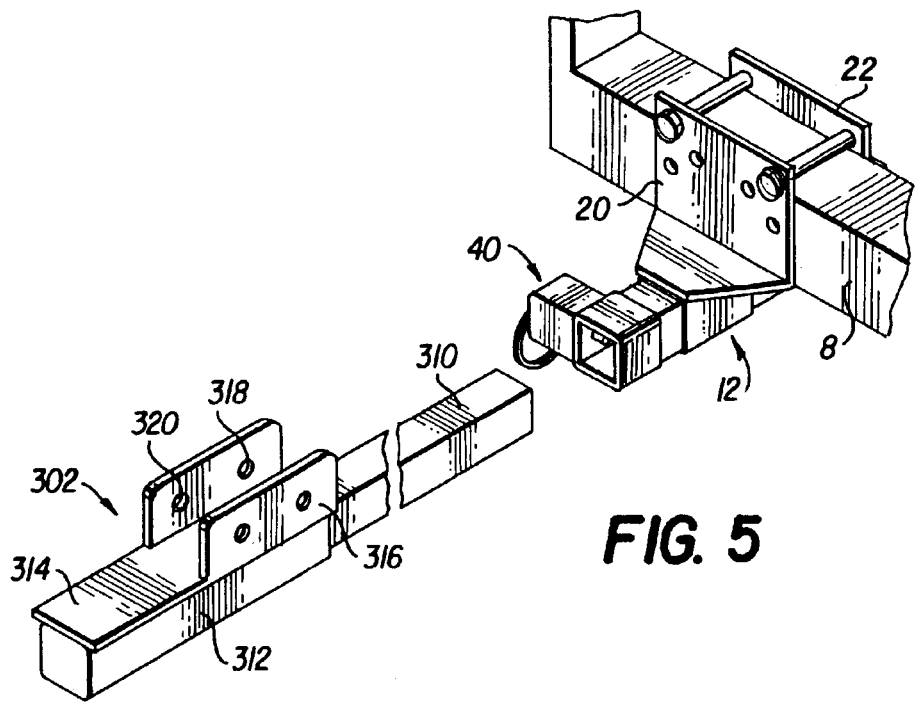
FIG. 5 is a perspective view drawing of a hinge bar used with the cargo rack in the suspended configuration.
Figure 6:
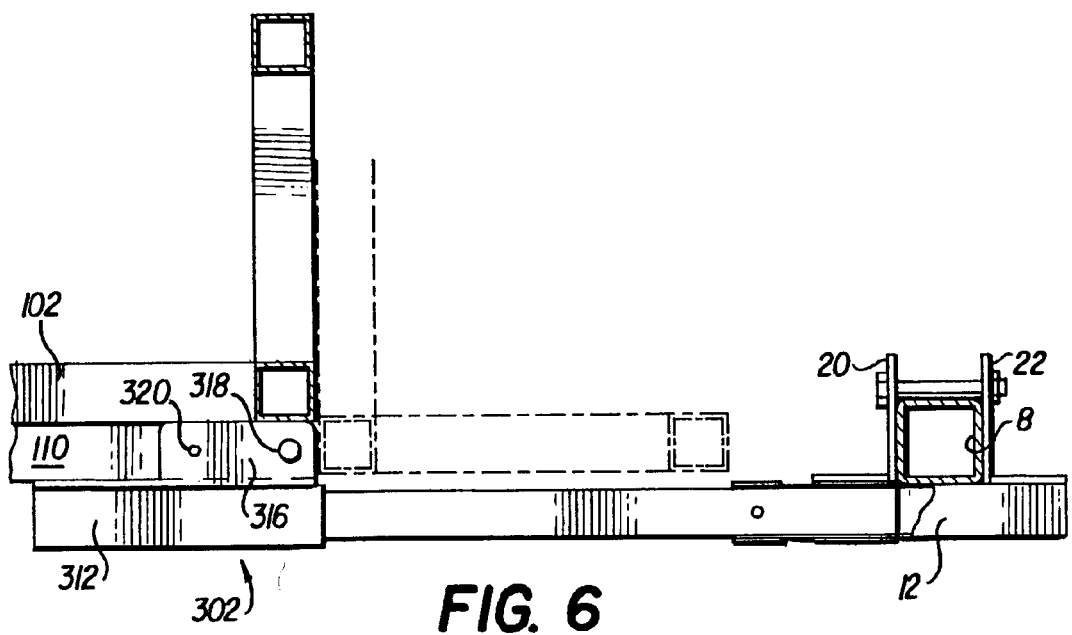
FIG. 6 is a side view drawing of the hinge bar of the cargo rack in the suspended configuration.

FIG. 5 shows a detailed view of the hinge bar 302, in which the front portion 310 of the hinge bar 302 inserted into the vehicle's tubular receiver 12 and secured thereto. The rear portion 312 of the hinge bar 302 includes a top support plate 314 having a bracket 316 with two sets of holes 318, 320 therein. The cargo rack's tubular receiver 110 is then placed onto the top support plate, as shown in FIGS. 3 and 6. The receiver 110 includes holes in its sides that match bracket holes 318, 320. The receiver 110 is attached to the bracket 316 using a nut and bolt through at least hole 318, and if desired, hole 320. If only hole 318 is used, the cargo rack 100 pivots about the bolt inserted through hole 318 to move between its open position (shown in solid lines in FIG. 6) and stowed position (shown in dashed lines in FIG. 6). If both holes 318 and 320 are used, the bolt inserted through hole 320 secures the cargo rack in its open position. It should be noted that hinge bar 304 is identical to hinge bar 302 described above.

Figure 7:
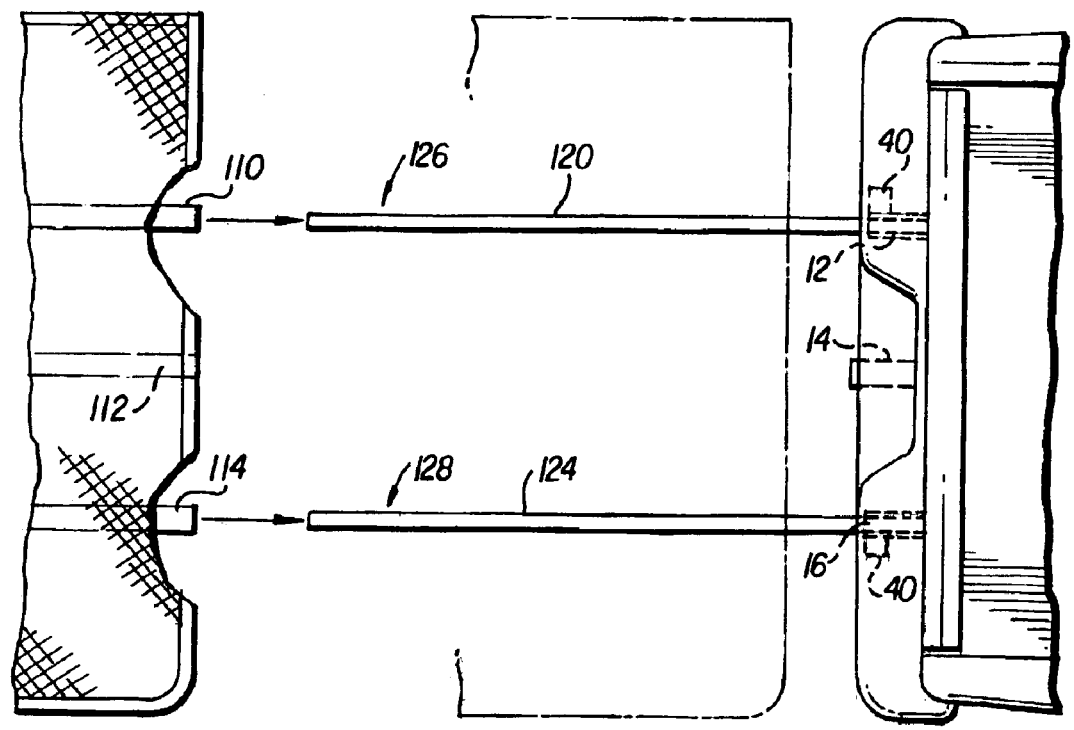
FIG. 7 is a top view drawing of a support bar used with the cargo rack in the suspended configuration.

In a second method of use of the first configuration of the invention, shown in solid lines in FIG. 7, the cargo rack 100 is attached to the vehicle 10 using two elongated support bars 120, 124, which are inserted into the cargo rack's side tubular receivers 110, 114 and the vehicle's side tubular receivers 12, 16 to hold the cargo rack 100 in the suspended configuration. The support bars 120, 124 are sufficiently long and so that they are able to provide the necessary support for the cargo rack 100.

The support bars 120, 124 are provided with holes on their front portion that engage a latch 40 on the vehicle's tubular receivers 12, 16 to secure the support bars 120, 124 to the vehicle, as explained later in greater detail. In similar fashion, the rear portion of the support bars 120, 124 have holes 126, 128 therein which align with holes in the tubular receivers 110,114 and are secured using a bolt and locking pin. Although using the support bars 120, 124 may provide a more secure attachment between the cargo rack 100 and the vehicle 10, it does not allow the cargo rack to pivot between its open and stowed positions.

Additionally, many vehicles, particularly trucks and sports utility vehicles, are equipped by the manufacturer or dealer with a center tubular receiver 14. Therefore, the cargo rack of the present invention includes a corresponding center tubular receiver 112 which may support the use of an additional support bar (not shown), similar to the support bars 120, 122. However, the use of the center support bar is not critical to the operation or use of the cargo rack of the present invention.

Now turning to the second configuration in which cargo rack 100 is pulled behind a vehicle in a trailer-like manner, as shown in FIGS. 2 and 8–12. The cargo rack in this configuration is rotated 90 degrees from the first configuration so that the ramp 106 is positioned away from the vehicle 10, as best shown in FIG. 2.

Wheels 250 on are attached to the sides of the cargo rack 100 to support the platform 102. The wheels 250 have a tubular axle 252 which is inserted into the ends of the cargo rack's center tubular receiver 112, as shown in FIGS. 9 and 10. The axle 252 includes a holes 252a that align with corresponding cargo receiver holes 112a. A pin is inserted through the axle hole 252a and the cargo receiver hole 112a to lock the wheel 250 to the cargo rack 100.

In this configuration, a hitch attachment 200 comprising a first shaft member 210 and a second shaft member 220 secures the cargo rack to the vehicle. A front end of the first shaft member 210 is inserted into the vehicle's center tubular receiver 14. A rear end of the first shaft member includes a flat rounded portion 212 having a hole 214 therein. The second member 220 has a U-shaped portion 216 with holes 218, which is secured to the rounded portion 212 of the first shaft member by a pin to rotatably attach the first and second shaft members.

A trailer bar 230 is inserted into the free end of the second shaft member 220 and secured thereto by inserting a pin through an opening 222 in the second shaft member and opening 232 in the trailer bar 230. The opposite end of the trailer bar 220 is inserted into a tubular receiver 116 that is attached to the underside of the cargo rack 100, as shown in FIG. 11. The tubular receiver 116 is perpendicular to the other cargo receivers 110, 112 and 114, as best shown in FIG. 1.

It should be understood that the bolt and pin described above to lock the various elements of the cargo rack are not meant to limit the invention, and that other types of locking means, such as cotter-type pins, a bolt and nut, or other similar locking means may be used.

Figure 13:
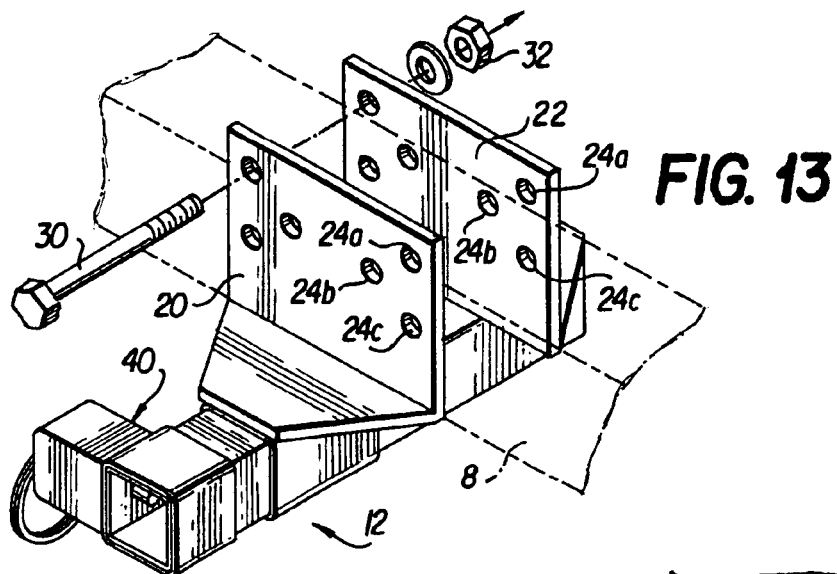
FIG. 13 is a perspective view drawing of a tubular receiver attached to a structural member of a vehicle.
Figure 14A:
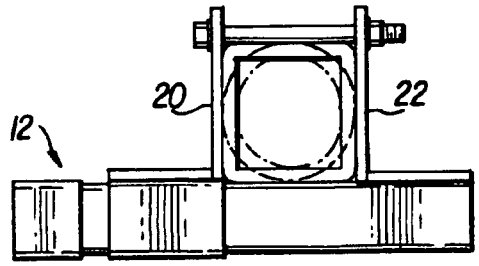
FIGS. 14A–14C are side view drawings of the tubular receiver brackets attached to varying sized and shaped structural members of the vehicle.
Figure 14B:
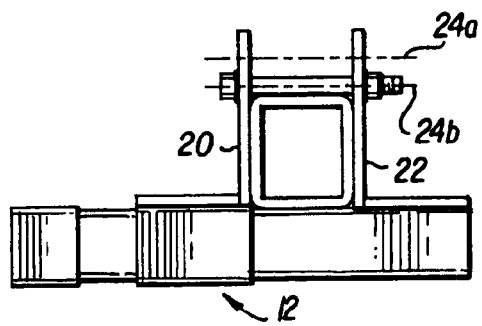
Figure 14C:
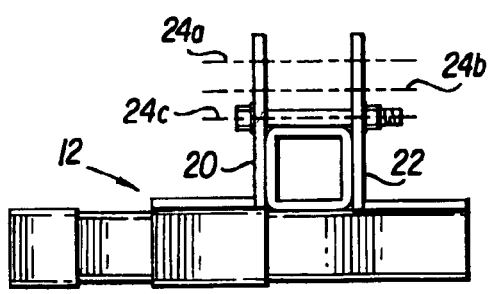

An additional feature of the invention is directed to the vehicle's side tubular receivers 12 and 16, shown in FIGS. 13 and 14. The description will be given with reference to vehicle's tubular receiver 12, which is identical to that of tubular receiver 16.

The tubular receiver 12 is secured to a support frame 8 on a vehicle 10, using two brackets 20, 22. The first bracket 20 is slidable along the tubular receiver 12 and the second bracket 22 is fixed to the tubular receiver 12. The slidable bracket 20 allows the tubular receiver 12 to be secured to support frames 8 having various thickness. Additionally, the brackets 20, 22 having a series of holes 24a–24c placed at various heights in the brackets which allow it to be secured to support frames 8 having various heights. The combination of the slidable bracket and the holes of varying heights allows the tubular receiver to be attached to a support frame of difference sizes and shapes as shown in FIGS. 14A–14B.

A bolt 30 is placed through one of the holes 24a–24c and secured by a nut 32. Due to the significant loads that may be placed onto the brackets 20, 22, the holes 24a–24c are staggered so that there is sufficient bracket material surrounding each hole to support a load. For example, if the holes had been perfectly aligned, there would have been only a thin piece of bracket material between the holes, which could possibly fail if a large enough load were placed on it. The staggered positioning of the holes 24a–24c ensures that the bracket 20, 22 can hold much larger loads.

Figure 15:
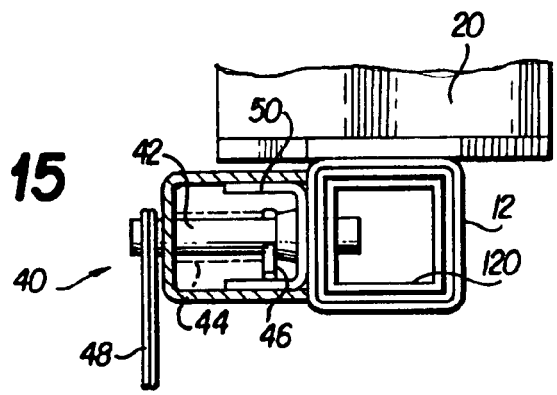
FIG. 15 is a front view of the tubular member showing the interior of a latch.
Figure 16:
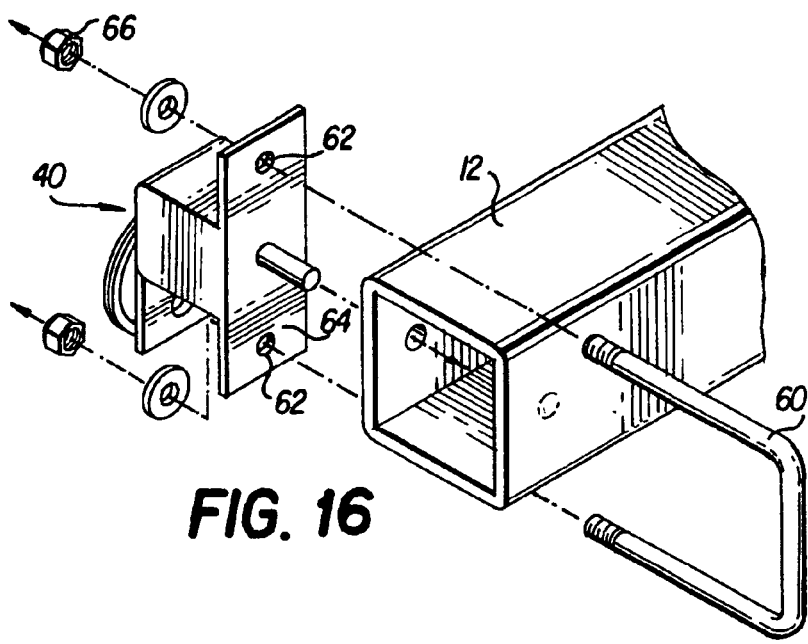
FIG. 16 shows a perspective view drawing of an alternative embodiment of the latch attached to the tubular receiver.

The tubular receiver 12 also includes a side latch 40 that automatically locks the support bar 120 when inserted therein. The latch 40 is shown best in FIGS. 13, 15 and 16. FIGS. 13 and 15 show a first embodiment of the latch 40, wherein the latch 40 is secure to the tubular receiver 12 by welding. FIG. 16 shows a second embodiment of the latch 40, wherein the latch 40 is secured to the tubular receiver 12 by a U-bolt 60, described in further detail hereinafter.

The latch 40 has a locking pin 42 that is biased inwardly by a spring 44 into the interior of the tubular receiver 12. To unlock the latch, the pin 42 is pulled out by using the ring 48. If the user wishes to maintain the latch 40 in the unlocked position, he may rotate the pin 42 so that a rod 46 connected to the pin 42 engages the edge of an internal U-bracket 50.

In operation, the pin 42 is secured in the unlock position by pulling the pin 42 out of the tubular receiver 12, and turning the ring 48 so that the rod 46 engages the U-bracket 50. The support bar 120 is then inserted into the receiver 12 and the ring 50 is rotated so that the rod 46 disengages the U-bracket 50. The spring 44 urges the pin 42 into the tubular receiver 12 and into contact with the outer surface of the inserted support bar 120. As the support bar 120 is pushed further into the tubular receiver 12, the pin 42 slides against an outer surface of the support bar 120 until it engages an opening therein, thereby locking the support bar. This feature automatically locks the support bar 120 to the vehicle 10, and acts as a safety feature by locking the cargo rack to the vehicle when a user might otherwise forget to insert a pin.

Figure 17:
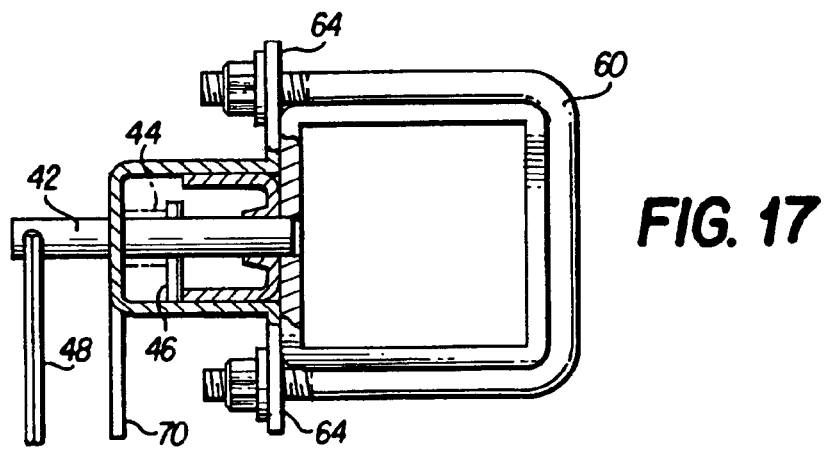
FIG. 17 shows a front view of the latch and tubular receiver in an unlocked position.
Figure 18:
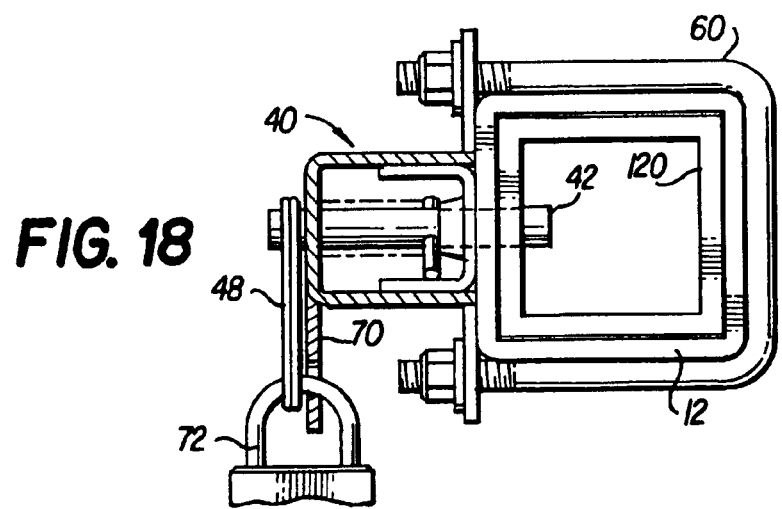
FIG. 18 shows a front view of latch and tubular receiver in a locked position.

FIGS. 16–18 show the second embodiment of latch 40. Here, the latch 40 is secured to the tubular receiver 12 using a U-bolt 60 that fits around the tubular receiver 12 and is inserted through openings 62 in side flanges or ears 64 of the latch 40. Nuts 66 are used to secure the U-bolt to the tubular receiver 12. Alternatively, ears 64 can be welded directly to receiver 12 without the U-bolt 60.

The latch 40 shown in FIGS. 16–18 includes an anti-theft means that prevents the unauthorized detachment of the cargo rack 100 from the vehicle. The anti-theft means is best shown in FIG. 18, and comprises a locking flange 70 on the latch 40. The locking flange is secured to the ring 48 by a lock 72 which prevents someone from pulling the pin 42 out of the tubular receiver 12. In this way, when a support bar 120 is inserted into the tubular receiver 12 it cannot be unlocked by pulling out the pin 42.

The invention as described above provides a cargo rack having two configurations for increasing the payload capacity of a vehicle. The cargo rack can be quickly and efficiently converted between its two configurations, providing a user with greater options and versatility for his transportation needs.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed:

1. A latch for locking a cargo carrier to a vehicle comprising:

a housing attached to a sidewall of a vehicle receiver, said housing including a spring biased locking pin that protrudes through the side wall of said receiver to automatically lock a support bar for a cargo carrier that is inserted into said receiver, wherein said housing includes a rod attached to the locking pin and an internal bracket secured to the inside wall of the housing, the rod cooperating with the internal bracket to secure the pin in a locked or unlocked position.

2. The latch for locking a cargo carrier to a vehicle of claim 1, wherein:

the bracket is a U-shaped bracket located adjacent the sidewall of the receiver such that in the unlocked position, the rod engages the ends of the U-shaped bracket to prevent the locking pin from protruding into the receiver, and in the locked position, the rod does not engage the ends of the U-shaped bracket so that the locking pin is free to be biased into the receiver to secure the support bar.

3. The latch for locking a cargo carrier to a vehicle of claim 2, wherein:

a portion of the locking pin extends out of the housing and has a handle attached thereto for grasping, the handle being used to rotate the rod into and out of engagement with the ends of the U-shaped bracket.

4. The latch for locking a cargo carrier to a vehicle of claim 3, wherein:

the housing includes a flange adjacent the handle so that the handle maybe secured to the flange when the locking pin is in the locked position thereby preventing the handle from moving the locking pin to the unlocked position.

5. The latch for locking a cargo carrier to a vehicle of claim 1, wherein:

the housing includes ears adjacent said sidewall of the receiver, the ears extending in opposite directions beyond said sidewall of the receiver, the portion of the ear extending beyond said sidewall of the receiver and having openings therein; and a fastening bolt having ends that are inserted through the openings in the ears to secure the housing to said receiver.

6. The latch for locking a cargo carrier to a vehicle of claim 1, wherein:

the spring biased locking pin includes a spring located between the rod and an opposing wall of the housing, the spring urging the locking pin into the receiver to lock the support bar.

7. A bracket for attaching a receiver to a vehicle for supporting a cargo carrier, comprising:

a female receiver attached to a support frame of a vehicle for receiving a support bar of a cargo carrier;

a first and second bracket that are attached to the female receiver and engage the support frame of the vehicle, wherein each bracket has a plurality of holes, the placement of the plurality of holes being staggered so that no two consecutive holes are vertically aligned; and a fastener that is inserted through the one set of holes to secure the brackets to the support frame of the vehicle, wherein the first bracket is fixedly secured to the receiver and the second bracket is slidably secured to the receiver, the second bracket being able to move along the receiver so that the first and second bracket can engage different size vehicle support frames.

8. A convertible cargo carrier that attaches to the rear of a vehicle, comprising:

a generally flat platform having a first configuration and a second configuration relative to a vehicle, wherein the first configuration and the second configuration are perpendicular to one another;

said first configuration having at least two receivers attached to the underside of the platform, the at least two receivers extending toward the vehicle alone the vehicle's longitudinal axis to suspend the cargo carrier behind the vehicle;

said second configuration having wheels attached to the ends of one of the at least two receivers of the first configuration, and an additional receiver attached to the underside of the platform, said additional receiver extending toward the vehicle along the vehicle's longitudinal axis and having a support bar inserted therein for securing the cargo carrier to the rear of the vehicle so that the cargo carrier is pulled behind the vehicle in a trailer-like fashion;

said at least two receivers of the first configuration comprises three receivers such that when the platform is moved to the second configuration the wheels are attached to the ends of the middle receiver;

the at least two receivers of the first configuration are secured to hinge bars which are attached to the vehicle such that in the first configuration the platform may be rotated into an upright stowed position;

wherein the hinge bars are inserted into vehicle receivers;

said vehicle receivers comprise a female receiver for receiving the hinge bar, a first and second bracket that engage a support frame of a vehicle, wherein each of the brackets have a plurality of holes, the placement of the plurality of holes being staggered so that no two consecutive holes are vertically aligned, and a fastener that is inserted into the holes to secure the brackets around the support frame of the vehicle.

9. The convertible cargo carrier that attaches to the rear of a vehicle of claim 8, wherein:

a housing is attached to a sidewall of said vehicle receiver, said housing including a spring biased locking pin that protrudes through the side wall of said vehicle receiver to automatically lock the hinge bar for a cargo carrier.

* * * * *